United States Patent [19]

Silvestrini

[11] Patent Number: 4,493,851
[45] Date of Patent: Jan. 15, 1985

[54] METHOD FOR SEPARATING THE PULP FROM THE SKIN OF TOMATOES

[75] Inventor: Jesus A. Silvestrini, Mendoza, Argentina

[73] Assignee: IMDEC S.R.L., Mendoza, Argentina

[21] Appl. No.: 410,248

[22] Filed: Aug. 23, 1982

Related U.S. Application Data

[62] Division of Ser. No. 253,373, Apr. 13, 1981, Pat. No. 4,355,572.

[51] Int. Cl.³ .............................................. A23N 7/00
[52] U.S. Cl. .................................... 426/482; 426/483
[58] Field of Search ............... 426/482, 483, 481, 518; 99/516, 540, 584, 586, 587

[56] References Cited

U.S. PATENT DOCUMENTS

| | | | |
|---|---|---|---|
| 1,277,148 | 8/1918 | Starr | 426/518 |
| 1,976,710 | 10/1934 | Carpentieri | 99/586 |
| 1,992,398 | 2/1935 | Ryder | 426/482 |
| 3,339,603 | 9/1967 | Dall'Argine et al. | |
| 4,315,039 | 2/1982 | Levati | 426/482 |

FOREIGN PATENT DOCUMENTS

| | | |
|---|---|---|
| 216382 | 12/1979 | Argentina . |
| 217471 | 3/1980 | Argentina . |
| 217472 | 3/1980 | Argentina . |
| 689531 | 4/1965 | Italy . |

Primary Examiner—George Yeung
Attorney, Agent, or Firm—Ducksworth, Allen, Dyer & Pettis

[57] ABSTRACT

Methods are described for separating the pulp from the skin of fruit, such as tomatoes, in which each fruit is gripped and transported by mechanism along a continuously circular path, a cut to the skin of the fruit is produced by cutting device adjacent the path and the pulp is urged away from the gripping and transporting apparatus at a pulp discharge position while the skin remains gripped by that apparatus to separate the pulp from the skin.

7 Claims, 5 Drawing Figures

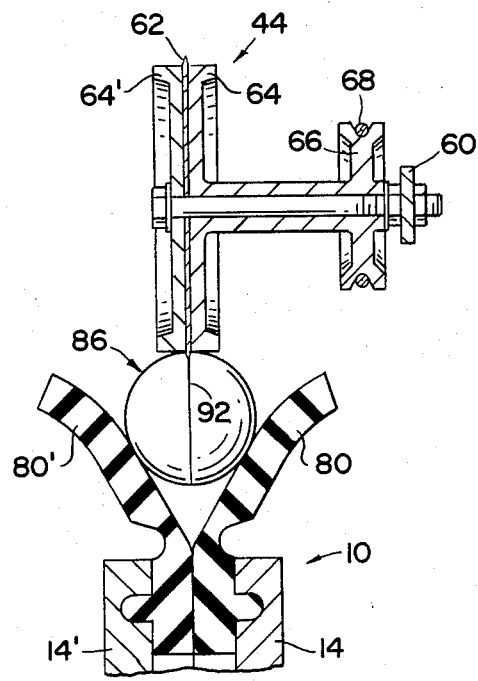
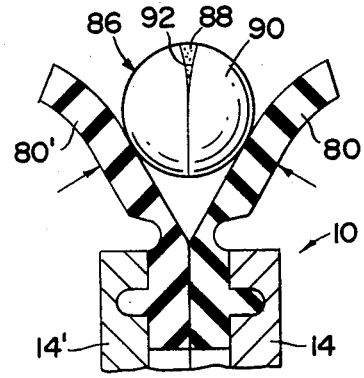
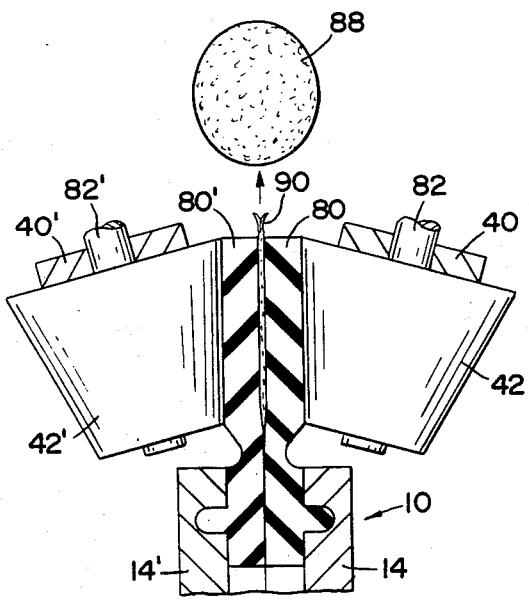
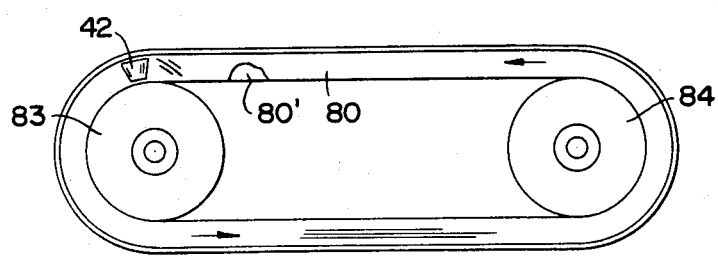
FIG. 2
FIG. 3
FIG. 4
FIG. 5

METHOD FOR SEPARATING THE PULP FROM THE SKIN OF TOMATOES

This application is a division of application Ser. No. 253,373 filed 4/13/81 now U.S. Pat. No. 4,355,572.

BACKGROUND OF THE INVENTION

This invention relates generally to the field of methods and apparatus for peeling fruit. More particularly, it relates to methods and apparatus for peeling fruits, such as tomatoes, without the use of caustic chemicals.

The most common method and apparatus used in peeling fruits, such as tomatoes, provide for scalding the fruit and then application of caustic chemicals to remove the skin therefrom. Certain other types of apparatus have attempted various mechanical techniques for gripping the fruit and stripping the skin or peel therefrom. However, these prior methods and types of apparatus have suffered from numerous disadvantages. The chemical type of peeling has necessitated the subsequent washing of the peeled pulp to remove remaining traces of chemicals, a process which may damage the pulp or remove otherwise edible portions thereof. Additionally, the juice resulting from the operation of these chemical type peeling devices has been unusable because of its contamination with the chemicals.

The previously known mechanical peelers for fruit of this type frequently have caused excessive damage and loss of usable pulp due to the mechanical gripping arrangement, and have also suffered from mechanical breakdown because of the complex and sometimes delicate moving parts necessary for satisfactory operation. Many types of the previously known mechanical peelers have also been suited only for peeling tomatoes of a predetermined size, a characteristic which requires an additional preliminary step of sorting by size and the provision of different machines for different sized fruit.

SUMMARY OF THE INVENTION

To overcome the disadvantages of the prior art, it is an object of the present invention to provide a method and apparatus for separating the pulp from the skin of fruit, such as tomatoes, which operate in a substantially continuous manner without the use of chemical elements or mechanical elements which may damage the pulp. It is a further object of this invention to provide such method and apparatus which is capable of handling, without adjustment, fruit of different sizes and shapes, and which permit the recovery for subsequent packing of juice produced during the peeling of the fruit.

To achieve the foregoing, as well as other objects, method and apparatus are provided for separating the pulp from the skin of fruit, such as tomatoes, which are supplied to the apparatus. This method and apparatus provides for gripping and transporting each of the supplied fruit along a path between a receiving position and a pulp discharge position, with the mechanism for gripping and transporting comprising two members for grippingly contacting the outer surface of the fruit skin on opposite sides of a plane extending through the fruit. A cut is produced, by a suitable mechanism, through a portion of the fruit skin remote from the gripping and transporting mechanism and in a plane extending generally through the fruit, and then the pulp is urged away from the gripping and transporting mechanism through the cut in the skin by additional apparatus while the skin is retained and gripped, whereby the pulp may be separated from the skin.

BRIEF DESCRIPTION OF THE DRAWINGS

This invention will be described with reference to the accompanying drawings in which:

FIG. 2 is a fragmentary sectional view taken along line 2—2 of FIG. 1, illustrating the skin cutting method and apparatus;

FIG. 3 is a fragmentary sectional view taken along line 3—3 of FIG. 1;

FIG. 4 is a fragmentary sectonal view taken along line 4—4 of FIG. 1 illustrating the separation of the fruit pulp from the skin; and FIG. 5 is a side elevational view of an alternative embodiment of the gripping and transporting mechanism for the apparatus of FIG. 1.

DESCRIPTION OF A PREFERRED EMBODIMENT

Figure 1:
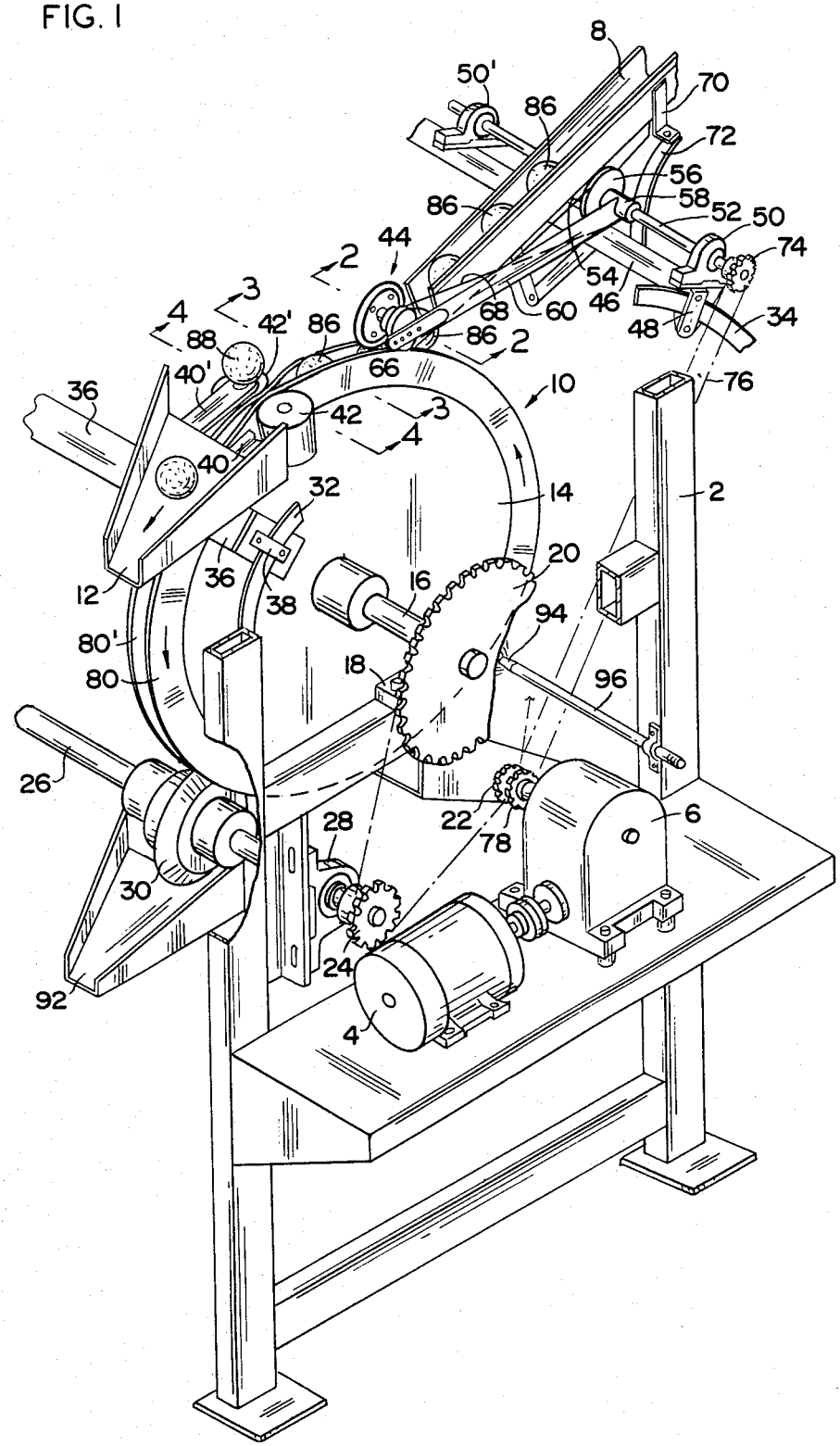
FIG. 1 is a partial front perspective view of a preferred embodiment of the apparatus of this invention and of one form of apparatus suitable for practicing the method of this invention.

A particularly preferred embodiment for practicing the teachings of this invention is illustrated in the drawings of FIGS. 1 through 4.

As illustrated in FIG. 1, the apparatus of this invention comprises, in general, a support frame 2, only part of which is illustrated, a drive motor 4 and gear box 6 amounted to the support frame and connected by a suitable coupling, a vibratory feed trough 8 for feeding fruit to the apparatus, gripping and transporting means, such as wheel 10, and pulp delivery chute 12, all of which are mounted to the frame 2. It may be noted that only a portion of the frame 2 is illustrated, since the frame is of relatively conventional construction, with the parts omitted being conventional in nature.

Wheel 10, which serves as the gripping and transporting means in this embodiment, may suitably comprise a pair of discs 14 and 14' (not shown) fabricated of a suitable metal, fastened together by conventional fasteners and rigidly mounted to shaft 16. The ends of this shaft 16 are carried by appropriate bearings, such as pillow blocks 18, mounted to the frame 2. Adjacent to one end of shaft 16 is a fixed sprocket 20 which is drivingly connected to gearbox sprocket 22 and an additional sprocket 24 by means of an appropriate belt or chain drive.

Sprocket 24 is affixed to one end of shaft 26, which is attached to frame 2 by suitable bearings 28. Carried on and affixed to this shaft 26 is rotating brush 30, which is used for purposes to be described below. Bearing blocks 28 may suitably be mounted for adjustable positioning in the vertical direction to increase or decrease the force of engagement between the brush 30 and the periphery of wheel 10.

Also attached to frame 2 in a conventional manner, not shown, are arcuate supports 32 and 34, respectively. These supports are of an arcuate configuration having its radius of curvature centered at the center of shaft 16. Only fragments of these arcuate supports 32 and 34 are illustrated, to avoid cluttering the drawing, since the method of attachment of the support frame 2 is conventional.

Arcuate support 32, and corresponding support 32' (not shown but mounted on the opposite side of wheel 10) have adjustably mounted thereto cross-bar support arm 36. This adjustable mounting, suitably by means by brackets 38, permits positioning of the cross-bar 36 at different points along the curvature of the support 32, for purposes to be described below. Attached to this cross-bar 36 are both the pulp discharge chute 12 and also a pair of arms 40 and 40', at the outer ends of which are rotatably attached pinch or compressor rollers 42 and 42', which are suitably of a frusto-conical configuration. Suitable conventional mounting apparatus may be provided, if desired, to permit adjustment of the spacing between the centers of the two rollers 42 and 42'.

Arcuate support 34, also carried by frame 2, and its non-illustrated companion 34' at the opposite end of frame 2, support the assembly illustrated in the upper right-hand portion of FIG. 1. This assembly includes feed trough 8 and the cutting blade assembly 44. These components are carried by cross-member 46 which is adjustably mounted to arcuate support member 34 by conventional means, such as a slot in the end of cross-bar 46 and a bridge member 48 over that slot and the support member 34, with similar structure at the opposite end. This arrangement provides for selectively repositioning the cross-bar 46 and its associated apparatus at various points along the arcuate support 34, for purposes to be described below.

Affixed to cross-bar 46 are bearing blocks 50 and 50', rotatably carrying shaft 52. Rigidly affixed to shaft 52 are eccentric 54 and pulley or sprocket 56. Rotatably carried on shaft 52 is sleeve 58 to which is affixed cutter arm 60. Rotatably attached, by means of a suitable bearing arrangement, to the end of arm 60 opposite sleeve 58 is a rotary cutting blade assembly 44, also illustrated in sectional view of FIG. 2. This rotary cutting blade assembly 44 suitably comprises a sharp, thin, disc-like blade 62 with a cutting-depth-limiting guide 64 concentric with and positioned adjacent to one side of blade, 62, preferably with a second similar guide 64' positioned adjacent to the opposite side of blade 62. Attached to, or suitably made integral with, guide 64 is a pulley 66 which is drivingly engaged by drive belt 68, which also engages pulley 56 on shaft 52. The blade 62 guides 64 and 64' and pulley 66 may all be carried by arm 60, as illustrated in the sectional view of FIG. 2.

The trough 8 may be rigidly affixed by bracket 70 to resilient supporting arms 72. The action of eccentric 54 affixed to shaft 52 and bearing against the underside of trough 8 serves to give a vibratory or oscillatory movement generally in a vertical direction to the trough 8 upon rotation of the shaft 52. Shaft 52 is rotatably driven by sprocket 74 affixed to the end thereof and which is drivingly engaged by the belt or chain 76, which is driven by sprocket 78 affixed to the output shaft of gearbox 6.

The general configuration of the gripping and transporting means of the wheel 10 may be seen more clearly in the sectional views of FIGS. 2 through 4. As shown in these figures, as well as FIG. 1, the wheel assembly 10 comprises the metal support discs 14 and 14' carried by the shaft 16 and having at their periphery resiliently deflectable gripping members 80 and 80'. While the members 80 and 80' may suitably be formed of a single extruded member of a suitable synthetic resin, within the scope of this invention, it is preferred that they be formed of two separate flange members clamped between the discs 14 and 14', as illustrated in FIGS. 2 through 5. Suitably, the flange members 80 and 80' may have concentric ridges which are received into corresponding concentric grooves on the mutually facing surfaces of the disc 14 and 14' to secure the resiliently deflectable members 80 and 80' against radially outward movement, with respect to the discs 14 and 14'. It is preferred that these deflectable members 80 and 80' be formed in the manner of endless annular members of a suitable synthetic resin and having an undeflected configuration substantially similar to that illustrated in FIGS. 2 and 3. In this configuration, with the members 80 and 80' extending toward one another in the direction toward the supporting disc 14 and 14' the flanges defined by the deflectable members have a generally V-shaped cross-section extending radially outwardly at the periphery of the discs 14 and 14', thus forming a trough-like structure around the periphery of the discs 14 and 14'.

As illustrated in FIG. 4, the resilient members 80 and 80' are deflectable toward another to effect a squeezing force upon anything within the trough portion. This squeezing is effected by the engagement of the axially outer surfaces of the members 80 and 80' by the frusto-conical pinch rollers 42 and 42'. As noted above, these pinch rollers 42 and 42' are carried upon members 40 and 40' and are attached thereto by suitable shaft 82 and 82' for rotation about the axis thereof. The rollers 42 and 42' are mounted and tapered in such a manner that the apex of the truncated conical configuration would be at the center of the main shaft 16 supporting the wheel 10, so that there will be rolling surface contact between the engaged surfaces of the rollers 42 and 42' and the axially outer surfaces of the resilient members 80 and 80'.

FIG. 5 illustrates an alternative apparatus for gripping and transporting in which the discs 14 and 14' are replaced by a pair of spaced apart pulleys 84 and 82 and in which the deflectable members 80 and 80', suitably in the form of a single V-shaped member, are stretched around those pulleys as an endless belt. With such a structure the feed trough 8 can suitably deposit the fruit onto the belt adjacent to the top of pulley 84 with the pinch rollers 42 being positioned adjacent to pulley 82. The pulleys 82 and 84 would suitably be driven in a manner similar to the way the shaft 16 drives the discs 14 and 14' in the embodiment of FIG. 1.

From the foregoing description of the apparatus, the method of operation and of separating the pulp of a fruit from its skin may be seen to be as follows.

Fruit to be peeled, such as tomatoes which have been scalded to loosen the skin thereof, are transported along a conveyor system, which forms no part of this invention. At appropriate exit stations from the conveyor, the fruit are directed into the supply trough 8 of the present apparatus, for delivery to the skin removing apparatus. This trough 8 has imparted to it a vibratory motion, by means of eccentric 54 affixed to rotating shaft 52. The vibratory motion imparted to the trough 8 is provided, in a manner well known in the art, to urge the fruit to descend the angled trough such that the stem axis, which extends through the stem and blossom ends of the fruit, remains generally aligned with the longitudinal direction of the feed trough 8. This alignment of the stem axis is beneficial for peeling certain fruit such as Italian tomatoes, but is generally unnecessary for other types. It may be noted that the angle of downward slope of feed trough 8 may be adjusted by moving the cross-bar support member 46 to different positions on its arcuate support 34. This may be accomplished by loosening the bridge members 48, repositioning the cross-bar 46, and retightenting the bridge member 48. By adjusting this angle the rate of feed of the fruit and its point of reception into the gripping and transporting apparatus can be adjusted.

As illustrated in FIG. 1, the tomatoes 86 are delivered to the gripping and transporting apparatus (wheel assembly 10 in this preferred embodiment) at a point somewhat ahead of the uppermost portion of the wheel 10 in its rotary travel. As described above, while assembly 10 carries the gripping and transporting means, which suitably comprises two resiliently deflectable members 80 and 80' for grippingly contacting the outer surface of the skin of the fruit. The fruit contacting portions of the members 80 and 80', which in this embodiment are endless, annular members clamped together to form a trough-like structure normally having a generally V-shaped cross-section, are provided with ridges, dimples, grooves, or other surface characteristics suitable for providing a firm gripping engagement with the outer skin of the fruit delivered thereto. Since the normal configuration of these members 80 and 80', which form the radially outermost portions of the transporting and gripping mechanism, is normally V-shaped in cross section, the fruit 86 delivered thereto will drop into the trough formed by such V-shape, thus to be gripped thereby. By virtue of the cross-sectional configuration, virtually any size or shape of fruit can be gripped and transported.

As the fruit 86 are carried by the gripping and transporting mechanism around the path of rotation of the wheel assembly 10, they next encounter means, such as the blade assembly 44, for cutting the skin of the fruit. As illustrated in FIG. 2, only a small annular portion of the cutting blade 62 projects beyond the cutting-depth-limiting guides 64 and 64', so that any cut produced necessarily will be quite shallow, preferably just through the skin of the fruit. As shown in FIG. 1, the cutting assembly 44 is pivotably supported by arm 60 on shaft 52 so that it may rest gently, under the force of gravity, against the fruit being presented thereto. Preferably the blade 62 and cutting-depth-limiting guides 64 and 64' are rotating in an angular direction opposite to that of the wheel assembly 10. Thus, engagement between the fruit 86 and the blade 62 and cutting-depth-limiting guides 64 and 64' will cause the blade and guide to ride up over the fruit, as shown in FIG. 2, producing a cut 92 through the skin of the fruit while so doing. Since the fruit had been oriented during its passage down the supply trough 18 to have its axis aligned generally with the longitudinal axis of the trough before reception between the members 80 and 80', this cut suitably will be a plane extending generally through the stem axis of the fruit.

As the fruit continues to be transported around the path defined by its gripping engagement with members 80 and 80' it begins to approach a portion of such path in which the rollers 42 and 42' deflect the resilient members 80 and 80' toward one another. Such deflection thus effects a squeezing force upon the fruit skin outer surface in the direction indicated by the arrows of FIG. 3. This squeezing force, along with the centrifugal force resulting from rotation of the wheel assembly 10, serves to urge the fruit pulp out of the fruit skin 90, which remains gripped by the members 80 and 80', through the cut or slit 92 in the skin produced by the cutting assembly 44. This squeezing force ultimately serves to expel the pulp 88 from the skin through the slit 92, in the manner indicated in sectional view of FIG. 4. As the pulp 88 is discharged from the skin 90, that skin 90 remains gripped between the mutually facing surfaces of members 80 and 80', under the squeezing engagement of those members by the rollers 42 and 42'. By virtue of the rotational motion of the wheel assembly 10 imparted to the pulp 88, as well as the location of this point of discharge of the pulp 88 from the skin 90, the pulp 88 is discharged into the chute 12, where it is delivered to suitable collecting means. It may be noted that the positioning of the discharge chute 12, as well as of the pinch rollers 42 and 42', may be adjusted by adjusting the position of cross-bar 36 upon the arcuate support 32, in a manner generally similar to the method of adjusting the supply trough 8.

As the gripping and transporting apparatus continues its advance along its endless path, beyond the point of engagement with rollers 42 and 42', the resilient members 80 and 80' again assume their relaxed, open position, forming a trough-like arrangement having a generally V-shaped cross-section. This return of the members 80 and 80' to their undeflected position thus releases the grip of those members upon the fruit skin 90, permitting it to drop into the skin discharge chute 92. The removal of the skin from the members 80 and 80' is further effected by the engagement of rotating brush 30 with the mutually facing portions of members 80 and 80'. The brush 30 is preferably configured as a circular structure having a tapered peripheral cross-section to closely engage the interior of the V-shaped trough formed by the members 80 and 80'. This brush 30 is rotated in an angular direction the same as the direction of rotation of the wheel assembly 10, thus maximizing the brushing action of the engagement therebetween. This brushing thus serves to remove all remaining traces of the fruit skin from the transporting mechanism.

As the gripping and transporting mechanism continues around its endless path, it passes by at least one washing jet 94, which discharges a suitable cleaning fluid, such as water, from the distribution tube 96 onto the fruit gripping portions of the members 80 and 80'. This jet of cleaning fluid thus serves to wash away any traces of the juice from the fruit remaining after the skin has been brushed away by rotating brush 30. Thus, the fruit gripping surfaces of the gripping and transporting means are cleaned and made ready for reception of additional fruit from the supply trough 8 as the wheel 10 continues its rotation.

From the foregoing description, it may be seen that the method and apparatus of this invention provide for continuous separation of pulp of fruit from its skin, utilizing a gripping and transporting structure which functions on fruit of substantially any commercial size. The absence of chemical processing permits the recovery and use of virtually all juice which may be extracted during the peeling process and also eliminates necessity for washing and possibly damaging the peeled pulp. Also, by virtue of the simplicity of the apparatus and its utilization of rotary motion, this method and apparatus provides for a smoother, continuous operation with fewer mechanical breakdowns.

While a preferred embodiment of the method and apparatus of this invention has been described above with reference to the peeling of tomatoes, obviously numerous other types of fruit having similar requirements for peeling could be used equally well. Also, while the invention is illustrated with reference to a circular, wheel-like gripping and transporting mechanism, it is to be understood that the principles apply equally well to numberous other configurations, including, but not limited to, the double-wheel and belt arrangement of FIG. 5. Similarly, other types of guides and devices could be utilized for resiliently deflecting the members 80 and 80', in place of the rollers 42 and 42'. Accordingly, since these, as well as numerous other modifications of the disclosed apparatus and method, all within the scope of the invention, will readily occur to those skilled in the art, the scope of this invention is not to be limited by the foregoing description but solely by the claims appended hereto.

What is claimed is:

1. A method of separating pulp from the skin of tomatoes, comprising the steps of
   gripping the outer surface of said skin on opposite sides of a plane extending generally through said fruit, by a pair of generally opposed, resiliently deflectable members;
   carrying said fruit around at least a portion of a continuously circular path;
   then producing a cut through a portion of said skin remote from said gripping contact and in a plane extending generally through said fruit; and
   urging said pulp away from said gripped skin through said cut in said skin by the centrifugal force imparted by said movement around said continuously circular path, whereby the pulp is separated from the skin.

2. The method of claim 1 wherein said members are resiliently deflectable toward one another and wherein said pulp is urged away from said gripped skin by deflecting said members toward one another after said cut is produced to effect a squeezing force upon said skin, whereby the pulp is urged out of the gripped skin.

3. The method of claim 2 wherein said steps are carried out along a first predetermined portion of said continuously circular path, said first predetermined portion extending between a fruit receiving position and a pulp discharge position.

4. The method of claim 3 wherein said members are deflected toward one another at a point in said path adjacent said pulp discharge position.

5. The method of claim 3 further comprising the step of discharging said fruit skin from said gripping after said pulp is separated from said skin, whereby the skin is so discharged at a point in the endless path following the first predetermined portion thereof.

6. The method of claim 5 wherein said discharge is effected by termination of said gripping by said members and by contacting said members with brushing means.

7. The method of claim 5 further comprising the step of washing the fruit gripping surfaces of said members in a portion of said endless path located between said pulp discharge position and said fruit receiving position.

* * * * *